(12) United States Patent
Veeramreddi et al.

(10) Patent No.: US 9,882,490 B2
(45) Date of Patent: Jan. 30, 2018

(54) PARALLEL HIGH SIDE SWITCHES FOR A BUCK CONVERTER

(71) Applicant: Texas Instruments Incorporated, Dallas, TX (US)

(72) Inventors: Srinivas Venkata Veeramreddi, Telangana (IN); Murugesh Prashanth Subramaniam, Channai (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/160,836

(22) Filed: May 20, 2016

(65) Prior Publication Data

US 2017/0338742 A1 Nov. 23, 2017

(51) Int. Cl.
  *H02M 3/158* (2006.01)
  *H02M 1/08* (2006.01)

(52) U.S. Cl.
  CPC ............ *H02M 3/1588* (2013.01); *H02M 1/08* (2013.01)

(58) Field of Classification Search
  CPC ....................................... H02M 3/158–3/1588
  See application file for complete search history.

(56) References Cited

U.S. PATENT DOCUMENTS

| | | | |
|---|---|---|---|
| 5,861,735 A | 1/1999 | Uchida | |
| 2005/0030770 A1* | 2/2005 | Sutardja | H02M 3/1588 363/41 |
| 2008/0007236 A1* | 1/2008 | Elbanhawy | H02M 3/157 323/283 |
| 2008/0303500 A1* | 12/2008 | Hasegawa | H02M 3/1588 323/282 |
| 2013/0025893 A1* | 1/2013 | Ota | H02J 1/10 173/2 |
| 2015/0303801 A1 | 10/2015 | Childs | |

FOREIGN PATENT DOCUMENTS

| | | |
|---|---|---|
| CN | 103401423 A | 11/2013 |
| GB | 2521704 A | 7/2015 |

OTHER PUBLICATIONS

PCT Search Report for Application No. PCT/US 2017/033844, dated Aug. 24, 2017.

* cited by examiner

*Primary Examiner* — Gary L Laxton
*Assistant Examiner* — Peter Novak
(74) *Attorney, Agent, or Firm* — Lawrence J. Bassuk; Charles A. Brill; Frank D. Cimino

(57) ABSTRACT

A power stage for a DC-to-DC voltage converter includes a voltage input, a high-side n-channel transistor, a high-side p-channel transistor, and a low-side n-channel transistor. The voltage input is couplable to a supply voltage. The drain terminal of the high-side n-channel transistor is coupled to the voltage input and the source terminal is coupled to a first node that is couplable to an output stage of the DC-to-DC converter. The source terminal of the high-side p-channel transistor is coupled to the voltage input and the drain terminal is coupled to the first node. The drain terminal of the low-side n-channel transistor is coupled to the first node and the source terminal is coupled to a ground.

15 Claims, 3 Drawing Sheets

PARALLEL HIGH SIDE SWITCHES FOR A BUCK CONVERTER

BACKGROUND

The increasing demand of integrating electronic devices onto automotive, industrial, and customer platforms requires more sophisticated power conversion and distribution designs. Often these electronic devices include embedded processors, memories, and other electronic components that are operated from one battery source. DC-to-DC voltage converters are used to supply different voltages to the different electronic device In pursuit of reducing the overall solution form factor for battery powered devices, there is an increasing trend of moving from two AA (2AA) cells (having a voltage range of approximately 2V to 3.2V) to a single AA (1AA) cell (having a voltage range of approximately 1V to 1.6V). The power stage for a typical DC-to-DC converter employs two field effect transistors (FETs) connected in series. The power transistors used for devices that employ a 2AA cell power source are usually high voltage devices (for reliability reasons) and would not conduct for 1AA cell voltage levels due to the high threshold voltages of these transistors. Using low-voltage transistors for the power stage solves this conduction problem, but there would be reliability related concerns when the same device is expected to work from two AA cells.

SUMMARY

Illustrative aspects of the present disclosure are directed to a power stage for a DC-to-DC voltage converter, the power stage including a voltage input, a high-side n-channel transistor, a high-side p-channel transistor, and a low-side n-channel transistor. The voltage input is couplable to a supply voltage. The drain terminal of the high-side n-channel transistor is coupled to the voltage input and the source terminal is coupled to a first node that is couplable to an output stage of the DC-to-DC converter. The source terminal of the high-side p-channel transistor is coupled to the voltage input and the drain terminal is coupled to the first node. The drain terminal of the low-side n-channel transistor is coupled to the first node and the source terminal is coupled to a ground.

Other illustrative aspects of the present disclosure are directed to a DC-to-DC voltage converter that includes a voltage input, a high-side n-channel transistor, a high-side p-channel transistor, a low-side n-channel transistor, an inductor, and a capacitor. The voltage input is couplable to a supply voltage. The drain terminal of the high-side n-channel transistor is coupled to the voltage input and the source terminal is coupled to a first node. The source terminal of the high-side p-channel transistor is coupled to the voltage input and the drain terminal is coupled to the first node. The drain terminal of the low-side n-channel transistor is coupled to the first node and the source terminal is coupled to a ground. The inductor is coupled between the first node and a converter output. The capacitor is coupled between the converter output and ground.

Other illustrative aspects of the present disclosure are directed to a method of operating a power stage of a DC-to-DC converter. Pursuant to some of such methods, a high-side n-channel transistor is provided. The drain terminal of the high-side n-channel transistor is coupled to a voltage input that is couplable to a power supply, and the source terminal is coupled to a first node that is couplable to an output stage of the DC-to-DC converter. A high-side p-channel transistor is also provided. The source terminal of the high-side p-channel transistor is coupled to the voltage input and the drain terminal is coupled to the first node. The power supply voltage is compared to a threshold voltage level. If the power supply voltage is greater than the threshold voltage, the high-side n-channel transistor is deactivated, and the high-side p-channel transistor is caused to serve as the active high-side transistor of the DC-to-DC converter. If the power supply voltage is less than the threshold voltage, the high-side p-channel transistor is deactivated, and the high-side n-channel transistor is caused to serve as the active high-side transistor of the DC-to-DC converter.

DETAILED DESCRIPTION

Figure 1:
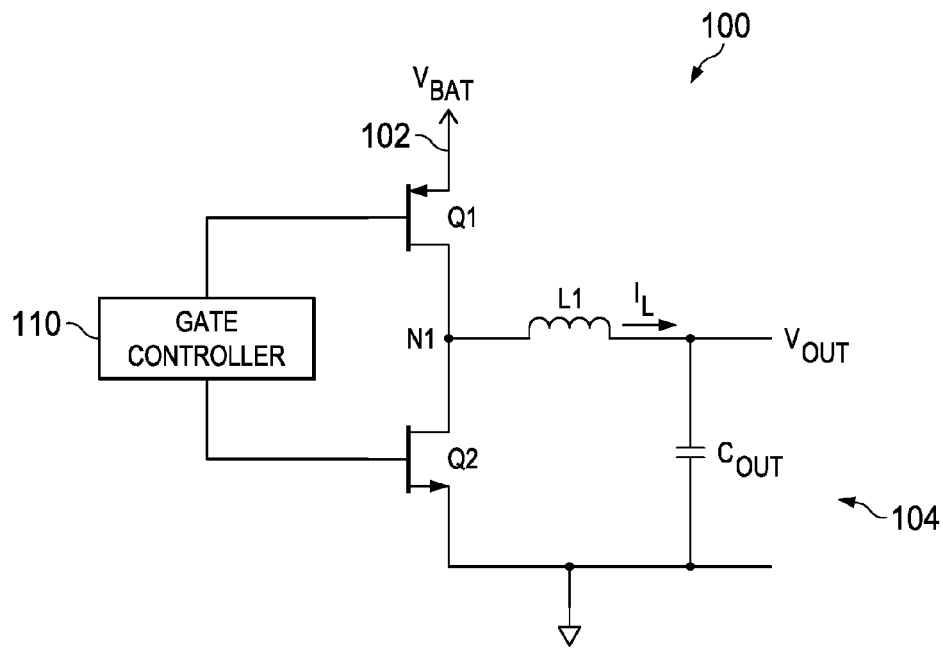
FIG. 1 is a schematic diagram of a DC-to-DC voltage converter.

FIG. 1 is a schematic diagram of a DC-to-DC voltage converter 100. The type of DC-to-DC voltage converter 100 depicted in FIG. 1 is sometimes referred to as a buck converter. The DC-to-DC voltage converter 100 includes a power stage that includes a high-side transistor Q1 and a low-side transistor Q2 that serve as switches. In the example of FIG. 1, transistor Q1 is a p-channel transistor and transistor Q2 is an n-channel transistor. The source of transistor Q1 is coupled to a voltage input 102 that is couplable to a power supply $V_{BAT}$. During operation of the DC-to-DC voltage converter 100, the voltage input 102 operates at an input voltage $V_{BAT}$, which is a DC voltage that is to be converted to another DC voltage by the DC-to-DC voltage converter 100. The drain of transistor Q1 is coupled to a node N1. The drain of transistor Q2 is coupled to the node N1 and the source of transistor Q2 is coupled to a ground node. The ground node may operate at a potential of ground or a potential that is different than or lower than the input voltage $V_{BAT}$. In the illustrative embodiment shown in FIG. 1, the high-side transistor Q1 is a PMOS (p-channel metal-oxide-semiconductor field-effect) transistor and the low-side transistor Q2 is an NMOS (n-channel metal-oxide-semiconductor field-effect) transistor, which constitutes a typical power stage for a DC-to-DC voltage converter.

A first terminal of an inductor L1 is coupled to the node N1. The second terminal of the inductor L1 is coupled to a capacitor $C_{OUT}$. The junction of the inductor L1 and the capacitor $C_{OUT}$ is the output 104 or output node of the DC-to-DC voltage converter 100, which operates at an output voltage $V_{OUT}$. The voltage $V_{OUT}$ is the DC voltage generated by the DC-to-DC voltage converter 100.

The gates of transistors Q1 and Q2 are coupled to a gate controller 110 that generates gate voltages to turn the transistors Q1 and Q2 off and on. Accordingly, the gate controller 110 serves as a switch controller to control the switching function of transistors Q1 and Q2. The DC-to-DC voltage converter 100 receives the input voltage $V_{BAT}$ at the input 102. The gate controller 110 turns transistors Q1 and Q2 off and on, so that one transistor is on while the other transistor is off. The off and on period controls the current $I_L$ flowing through the inductor L1. The current $I_L$ generates a voltage across the capacitor $C_{OUT}$, which is the output voltage $V_{OUT}$ of the DC-to-DC voltage converter 100. In discontinuous modes of operation, both transistor Q1 and transistor Q2 are turned off at the same time for a period.

In many implementations, the power supply $V_{BAT}$ is provided by a battery power supply comprising one or more batteries. In implementations such as the one shown in FIG. 1, wherein a PMOS transistor Q1 is used as the high-side switch, when $V_{BAT}$ is relatively low, i.e. close to the threshold voltage $V_{th}$ of the PMOS transistor Q1, the PMOS transistor Q1 will exhibit a very high resistance, and will therefore not act like an effective switch. Thus such a DC-to-DC voltage converter 100 has a limited of range of operation with regards to the power supply voltage $V_{BAT}$. The power transistors Q1 and Q2 used for devices that employ a 2AA cell voltage source (having a voltage range of approximately 2V to 3.2V) are typically high voltage devices and would not conduct for 1AA cell voltage levels (which typically range from approximately 1V to 1.6V) due to the high threshold voltages of these transistors. Using low-voltage transistors for the power stage solves this conduction problem, but there would then be reliability related concerns when the same device is expected to work from two AA cells.

Figure 2:
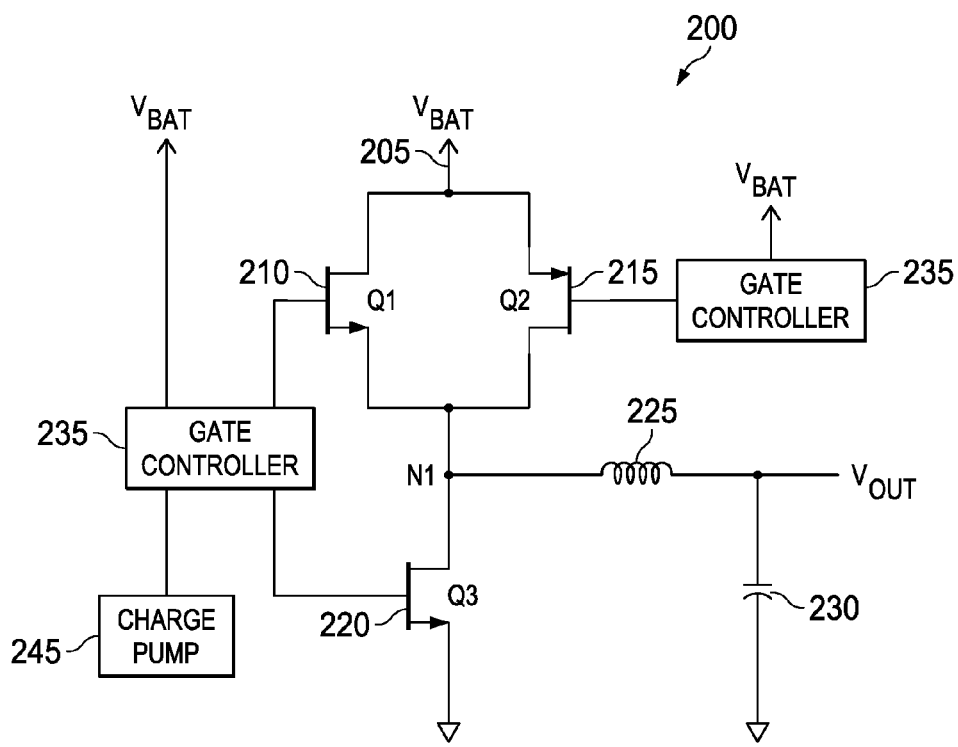
FIG. 2 is a schematic diagram of a DC-to-DC voltage converter whose power stage includes a high-side switch that includes an n-channel transistor and a p-channel transistor coupled in parallel.

FIG. 2 is a schematic diagram of a DC-to-DC voltage converter 200 whose power stage includes a high-side switch that includes an n-channel transistor Q1 210 and a p-channel transistor Q2 215 in parallel. The illustrative embodiment depicted in FIG. 2 demonstrates aspects of the present disclosure with respect to a buck DC-to-DC voltage converter, but the aspects of the present disclosure that are described herein can be implemented with other types of DC-to-DC converters as well, including but not limited to boost converters, buck-boost converters, flyback converters, and flybuck converters. The drain of n-channel transistor Q1 210 is coupled to a voltage input 205 that is couplable to a power supply $V_{BAT}$. The source of p-channel transistor Q2 215 is also coupled to the voltage input 205. During operation of the DC-to-DC voltage converter 200, the voltage input 205 operates at the input voltage $V_{BAT}$, which is a DC voltage that is to be converted to another DC voltage by the DC-to-DC voltage converter 200. The drain of the n-channel transistor Q1 210 and the source of the p-channel transistor 215 are both coupled to a node N1. The drain of n-channel transistor Q3 220 is coupled to the node N1 and the source of transistor Q3 220 is coupled to a ground node. The ground node may operate at a potential of ground or a potential that is different than or lower than the input voltage $V_{BAT}$. In the illustrative embodiment shown in FIG. 2, the high-side n-channel transistor Q1 210 and the low-side n-channel transistor Q3 220 are NMOS transistors and the high-side p-channel transistor Q2 215 is a PMOS transistor.

A first terminal of an inductor 225 is coupled to the node N1. The second terminal of the inductor 225 is coupled to an output capacitor 230. The junction of the inductor 225 and the output capacitor 230 is the output or output node of the DC-to-DC voltage converter 200, which operates at an output voltage $V_{OUT}$. The voltage $V_{OUT}$ is the DC voltage generated by the DC-to-DC voltage converter 200.

Depending on the voltage level of the power supply $V_{BAT}$, one of the high-side transistors, either n-channel transistor Q1 210 or p-channel transistor Q2 215, serves as the active switch of the power stage of the DC-to-DC voltage converter 200 while the other high-side transistor is deactivated. In an illustrative embodiment, the determination of which of the high-side transistors Q1 210 and Q2 215 to select as the active high-side switch is made by comparing the power supply voltage $V_{BAT}$ to a supply voltage threshold. If $V_{BAT}$ is less than the supply voltage threshold, the n-channel transistor Q1 210 serves as the active high-side transistor and the p-channel transistor Q2 215 is deactivated. If $V_{BAT}$ is greater than the supply voltage threshold, the p-channel transistor Q2 215 is selected as the active high-side transistor and the n-channel transistor Q1 210 is deactivated. Thus, when the power supply voltage $V_{BAT}$ is less than the supply voltage threshold, the n-channel transistor Q1 210 is the active high-side switch, thus allowing the high-side of the power stage to conduct at lower supply voltage levels. And when the power supply voltage $V_{BAT}$ is greater than the supply voltage threshold, the p-channel transistor Q2 215 is the active high-side switch, thus offering the increased reliability that is associated with a higher-voltage device.

In an alternative embodiment, the determination of which of the high-side transistors Q1 210 and Q2 215 to select as the active high-side switch is made by determining what type and how many batteries make up the power supply $V_{BAT}$. For example, if the power supply $V_{BAT}$ consists of a single AA battery, the n-channel transistor Q1 210 serves as the active high-side transistor and the p-channel transistor Q2 215 is deactivated. If, on the other hand, the power supply $V_{BAT}$ consists of two AA batteries, the p-channel transistor Q2 215 is selected as the active high-side transistor and the n-channel transistor Q1 210 is deactivated.

The gates of the high-side n-channel transistor Q1 210, the high-side p-channel transistor Q2 215, and n-channel low-side transistor Q3 220 are coupled to a gate controller 235 that generates gate voltages to turn the transistors Q1 210, Q2 215 and Q3 220 on and off. Thus, the gate controller 235 serves as a switch controller to control the switching function of transistors Q1 210, Q2 215 and Q3 220.

The gate control circuit 235 receives information regarding the power supply $V_{BAT}$ and, based on such information, controls one of the transistors Q1 210 and Q2 215 as the active high-side switch of the power stage and deactivates the other of the transistors Q1 210 and Q2 215. For example, in an illustrative embodiment, the gate control circuit 235 receives the supply voltage $V_{BAT}$ and compares it to a supply voltage threshold. In an illustrative embodiment the gate control circuit 235 includes a comparator for comparing the supply voltage $V_{BAT}$ to the supply voltage threshold. If $V_{BAT}$ is less than the supply voltage threshold, the gate control circuit 235 provides gate driver signals to the n-channel transistor Q1 210 and provides a voltage to the gate of p-channel transistor Q2 215 that turns off the p-channel transistor Q2 215. Thus, the p-channel transistor Q2 215 is deactivated and the n-channel transistor Q1 210 serves as the active transistor of the power stage when the supply voltage $V_{BAT}$ is less than the supply voltage threshold. If $V_{BAT}$ is greater than the supply voltage threshold, the gate control circuit 235 provides gate driver signals to the p-channel transistor Q2 215 and provides a voltage to the gate of n-channel transistor Q1 210 that turns off the n-channel transistor Q1 210. Thus, the n-channel transistor Q1 210 is deactivated and the p-channel transistor Q2 215 serves as the active transistor of the power stage when the supply voltage $V_{BAT}$ is greater than the supply voltage threshold.

In an illustrative implementation wherein the DC-to-DC converter 200 is intended to be compatible with both a power supply comprising a single AA cell and a power supply comprising two AA cells, the supply voltage threshold is set at a level that lies between the normal ranges of operation of a single-AA-cell power supply and a two-AA-cell power supply. For example, the supply voltage threshold can be set at approximately 1.8 volts, which lies between the normal ranges of operation of a single AA cell (1.0-1.6 V) and two AA cells (2.0-3.2 V).

In an alternative embodiment, the gate control circuit 235 receives or determines information regarding what type and how many batteries make up the power supply $V_{BAT}$. For example, if the gate controller 235 determines, or receives information indicating, that the power supply $V_{BAT}$ consists of a single AA battery, the gate control circuit 235 provides gate driver signals to the n-channel transistor Q1 210 and provides a voltage to the gate of p-channel transistor Q2 215 that turns off the p-channel transistor Q2 215. Thus, the p-channel transistor Q2 215 is deactivated and the n-channel transistor Q1 210 serves as the active transistor of the power stage if the power supply $V_{BAT}$ consists of a single AA battery. If, on the other hand, the gate controller 235 determines, or receives information indicating, that the power supply $V_{BAT}$ consists of two AA batteries, the gate control circuit 235 provides gate driver signals to the p-channel transistor Q2 215 and provides a voltage to the gate of n-channel transistor Q1 210 that turns off the n-channel transistor Q1 210. Thus, the n-channel transistor Q1 210 is deactivated and the p-channel transistor Q2 215 serves as the active transistor of the power stage if the power supply $V_{BAT}$ consists of two AA batteries.

In an illustrative embodiment, when n-channel transistor Q1 210 is the active high-side transistor of the DC-to-DC converter 200, i.e., when the power supply $V_{BAT}$ is a relatively lower-voltage power supply such as a single AA cell, the gate driver signal generated by the gate controller 235 for controlling the switching of the n-channel transistor Q1 210 is boosted using a charge pump circuit 245. This boosting of the gate driver signal causes the "on" voltage of the gate driver signal to be greater than the source voltage by an amount that is appreciably greater than the transistor voltage threshold $V_{th}$, thereby allowing the n-channel transistor Q1 210 to behave as an effective switch. If the magnitude of the gate driver signal is too low, as would be the case if the maximum level of the gate driver signal was substantially equal to a single AA cell voltage, the transistor Q1 210 does not behave as a switch.

In illustrative embodiments of the present disclosure, the transistors Q1 210, Q2 215, and Q3 220 are all implemented with thick gate oxide transistors, which are capable of handling 3.3 volts. Accordingly, all of these transistors are capable of working with either a single AA cell power supply or with a power supply consisting of two AA cells.

Figure 3:
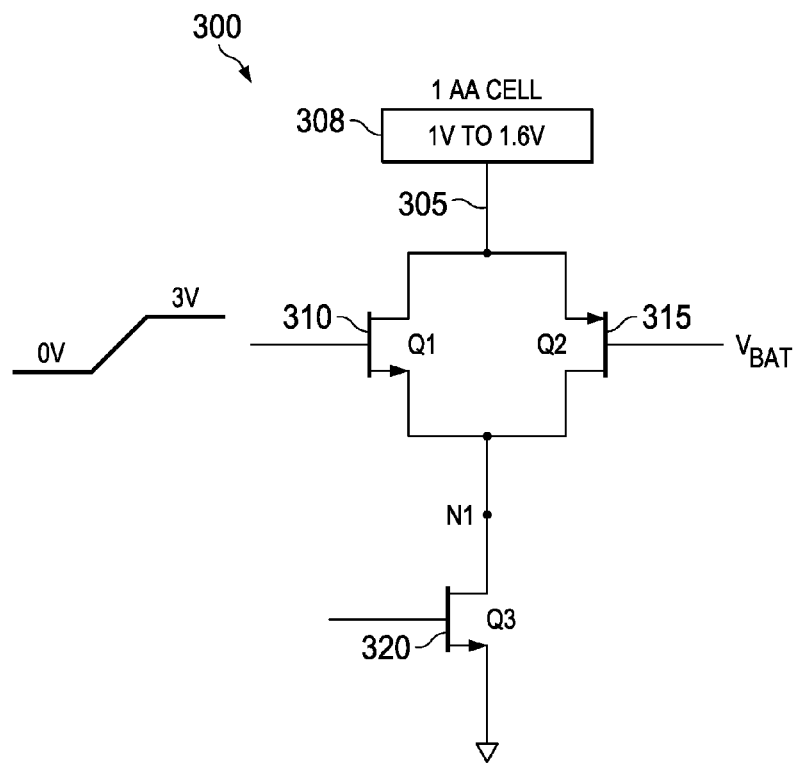
FIG. 3 is a schematic diagram representing a power stage of DC-to-DC voltage converter such as that shown in FIG. 2 powered by a single AA cell power supply.

FIG. 3 is a schematic diagram representing a power stage 300 of a DC-to-DC voltage converter, such as that shown in FIG. 2, powered by a single AA cell power supply. The drain of n-channel transistor Q1 310 is coupled to a voltage input 305 that is connected to a power supply $V_{BAT}$ 308 that consists of a single AA cell. The source of p-channel transistor Q2 315 is also coupled to the voltage input 305. The drain of the n-channel transistor Q1 310 and the source of the p-channel transistor 315 are both coupled to a node N1. The drain of n-channel transistor Q3 320 is coupled to the node N1 and the source of transistor Q3 320 is coupled to a ground node. Though not shown in FIG. 3, the node N1 is coupled to an output stage of the DC-to-DC power converter as shown in FIG. 2. Also, the gates of the high-side n-channel transistor Q1 310 and the high-side p-channel transistor Q2 315 are coupled to a gate control circuit such as gate controller 235 shown in FIG. 2, although the gate control circuit is not explicitly shown in FIG. 3.

The gate control circuit 235 determines, based on information regarding the power supply $V_{BAT}$ 308, which of the high-side transistors Q1 310 and Q2 315 are to serve as the active high-side transistor of the power stage 300. In the illustrative embodiment of FIGS. 3 and 4, wherein the DC-to-DC converter is intended to be compatible with both a power supply comprising a single AA cell and a power supply comprising two AA cells, this determination can be made in different ways, including comparing the power supply voltage $V_{BAT}$ to a supply voltage threshold (such as 1.8V), or by determining whether the power supply consists of one battery cell or two. In either case, when the power supply consists of a single AA battery as in FIG. 3, the gate controller 235 will determine that the n-channel transistor Q1 310 is to serve as the active high-side transistor of the power stage 300. Based on that determination, the gate controller 235 deactivates, or turns off, the p-channel transistor Q2 315.

In an illustrative embodiment, the gate controller 235 turns off the p-channel transistor Q2 315 by applying a voltage that is substantially equal to $V_{BAT}$ to the gate of the p-channel transistor Q2 315. In that event, the source voltage $V_s$ of transistor Q2 315 is substantially equal to the gate voltage $V_g$, in which case the p-channel transistor Q2 215 does not conduct any appreciable current. At the same time, the gate controller actively controls the n-channel high-side transistor Q1 310 and the transistor Q3 320 by controlling the duty cycle of gate driver signals provided to Q1 310 and Q3 320.

In an illustrative embodiment, the voltage of the gate driver signal provided to the n-channel high-side transistor Q1 310 is boosted using the charge pump circuit 245 shown in FIG. 2. For example, the gate driver signal for transistor Q1 310 might be boosted to have a range from 0V on the low end to approximately 3V on the high end, as shown in FIG. 3. This boosting of the gate driver signal for transistor Q1 310 allows for better performance of the high-side n-channel transistor Q1 310 in view of the relatively lower voltage level of the single AA cell power supply 308, as described with respect to FIG. 2.

Figure 4:
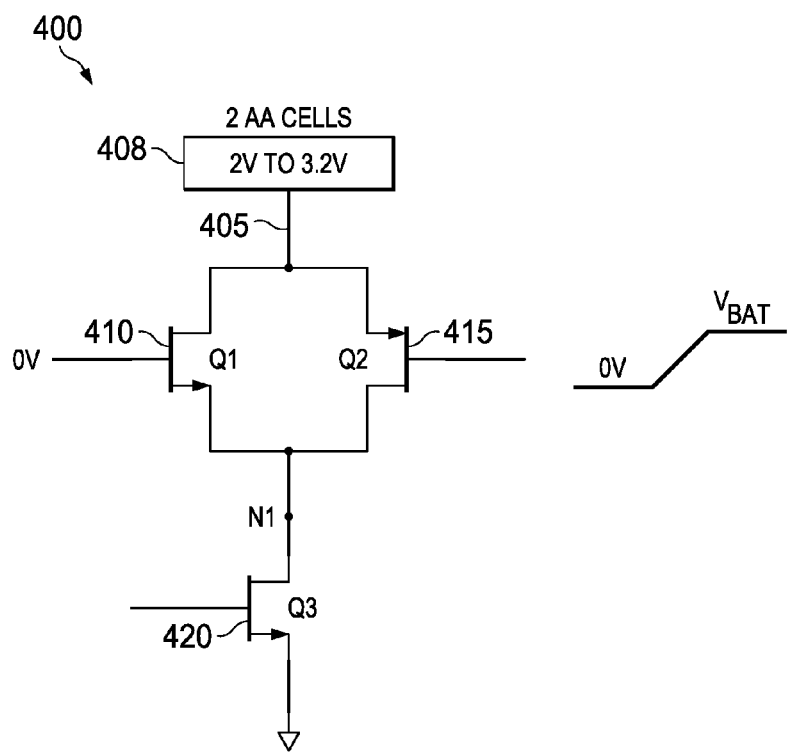
FIG. 4 is a schematic diagram representing a power stage of DC-to-DC voltage converter such as that shown in FIG. 2 powered by two AA cells.

FIG. 4 is a schematic diagram representing a power stage of DC-to-DC voltage converter such as that shown in FIG. 2 powered by two AA cells. The power stage 400 of FIG. 4 is substantially the same as that shown In FIGS. 3 and 4 except for the fact that the power supply $V_{BAT}$ 408 consists of two AA cells. The drain of n-channel transistor Q1 410 and the source of p-channel transistor Q2 415 are coupled to a voltage input 405 that is connected to the 2AA power supply $V_{BAT}$ 408. The source of the n-channel transistor Q1 410 and the drain of the p-channel transistor 415 are both coupled to a node N1. The drain of n-channel transistor Q3 420 is coupled to the node N1 and the source of transistor Q3 420 is coupled to a ground node. Though not shown in FIG. 4, the node N1 is coupled to an output stage of the DC-to-DC power converter as shown in FIG. 2. Also, the gates of the high-side n-channel transistor Q1 410 and the high-side p-channel transistor Q2 415 are coupled to a gate control circuit such as gate controller 235 shown in FIG. 2, although the gate control circuit is not explicitly shown in FIG. 4.

As previously mentioned, the gate control circuit 235 determines, based on information regarding the power supply $V_{BAT}$ 408, which of the high-side transistors Q1 410 and Q2 415 are to serve as the active high-side transistor of the power stage 400. In the illustrative embodiment of FIGS. 3 and 4, wherein the DC-to-DC converter is intended to be compatible with both a power supply comprising a single AA cell and a power supply comprising two AA cells, this determination can be made in different ways, including comparing the power supply voltage $V_{BAT}$ to a supply voltage threshold (such as 1.8V), or by determining whether the power supply consists of one battery cell or two. In either case, when the power supply consists of two AA batteries as in FIG. 4, the gate controller 235 will determine that the p-channel transistor Q2 410 is to serve as the active high-side transistor of the power stage 400. Based on that determination, the gate controller 235 deactivates, or turns off, the n-channel transistor Q1 410. In an illustrative embodiment, the gate controller 235 turns off the n-channel transistor Q1 410 by applying a voltage that is substantially equal to 0V to the gate of the n-channel transistor Q1 410. At the same time, the gate controller actively controls the p-channel high-side transistor Q2 415 and the transistor Q3 420 by controlling the duty cycle of gate driver signals provided to Q2 415 and Q3 420.

Figure 5:
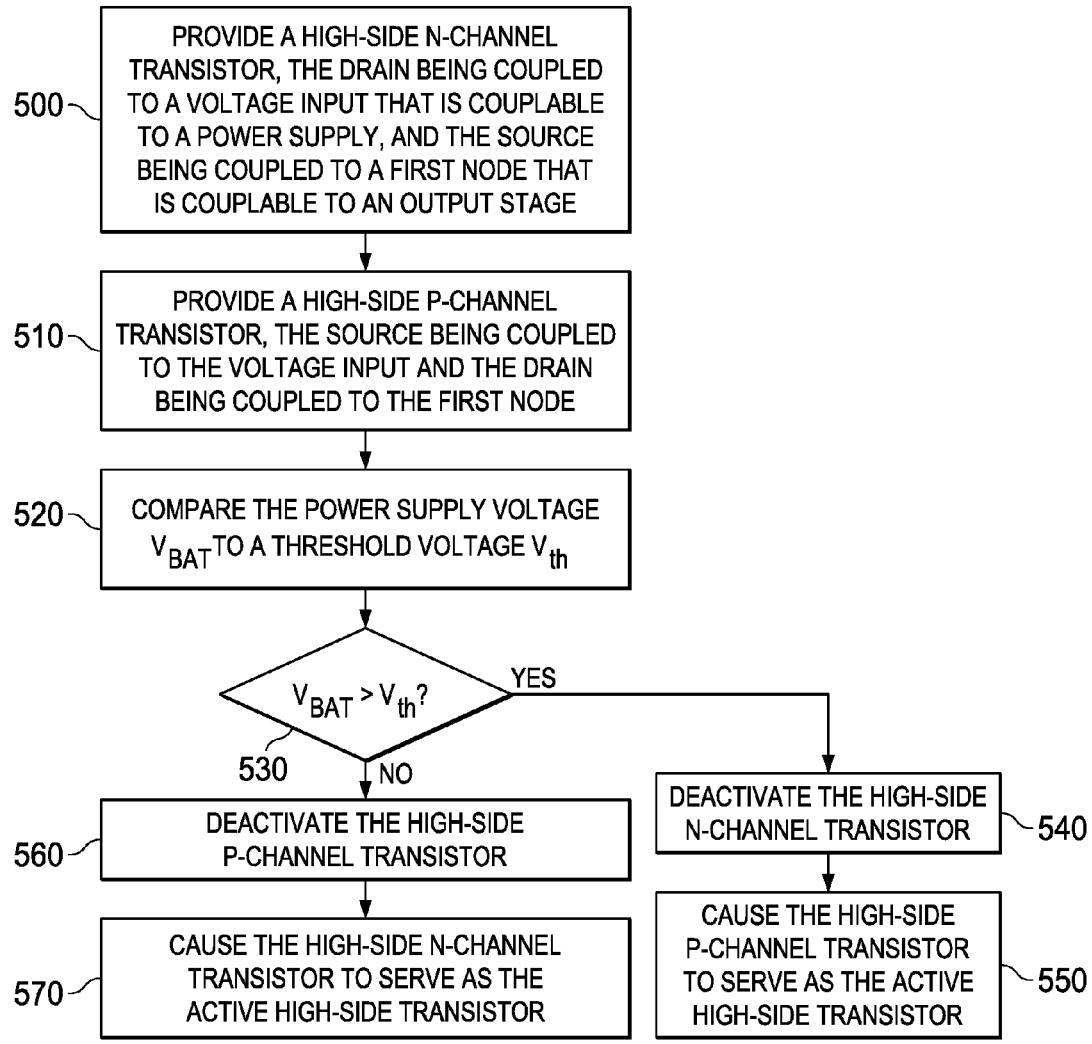
FIG. 5 is a flow chart representing a method of operating a power stage of a DC-to-DC converter.

FIG. 5 is a flow chart representing a method of operating a power stage of a DC-to-DC converter. At block 500 a high-side n-channel transistor is provided. The drain terminal of the high-side n-channel transistor is coupled to a voltage input that is couplable to a power supply, and the source terminal is coupled to a first node that is couplable to an output stage of the DC-to-DC converter. At block 510, a high-side p-channel transistor is provided. The source terminal of the high-side p-channel transistor is coupled to the voltage input and the drain terminal is coupled to the first node. At block 520, the power supply voltage is compared to a threshold voltage level. At decision block 530 it is determined whether the power supply voltage $V_{BAT}$ is greater than the power supply voltage threshold $V_{th}$. If the power supply voltage $V_{BAT}$ is greater than the threshold voltage $V_{th}$, the high-side n-channel transistor is deactivated, as shown at block 540, and the high-side p-channel transistor is caused to serve as the active high-side transistor of the DC-to-DC converter, as shown at block 550. If the power supply voltage $V_{BAT}$ is less than the threshold voltage $V_{th}$, the high-side p-channel transistor is deactivated, as shown at block 560, and the high-side n-channel transistor is caused to serve as the active high-side transistor of the DC-to-DC converter, as shown at block 570.

While some examples of DC-to-DC voltage converter power stages and methods for operating a power stage of a DC-to-DC voltage converter have been described in detail herein, it is to be understood that the inventive concepts may be otherwise variously embodied and employed and that the appended claims are intended to be construed to include such variations except insofar as limited by the prior art.

What is claimed is:

1. A power stage for a DC-to-DC voltage converter, comprising:
   a supply voltage input;
   a high-side n-channel transistor including a source terminal, a drain terminal and a gate terminal, the drain terminal being coupled to the supply voltage input and the source terminal being coupled to a first node that is coupled to an output of the DC-to-DC converter;
   a high-side p-channel transistor including a source terminal, a drain terminal and a gate terminal, the source terminal being coupled to the supply voltage input and the drain terminal being coupled to the first node;
   a low-side n-channel transistor including a source terminal, a drain terminal and a gate terminal, the drain terminal being coupled to the first node and the source terminal being coupled to a ground; and
   control circuitry operable to receive information regarding a supply voltage coupled to the voltage input:
      if the supply voltage is below a predetermined threshold value the control circuitry is operable to cause the high-side n-channel transistor to serve as the active high-side transistor of the DC-to-DC converter, while deactivating the high-side p-channel transistor by providing a constant voltage that is substantially equal to the supply voltage to the gate of the high-side p-channel transistor; and
      if the supply voltage is above the predetermined threshold value, the control circuitry is operable to cause the high-side p-channel transistor to serve as the active high-side transistor of the DC-to-DC converter by regulating the duty cycle of a gate driver signal provided to the gate of the high-side p-channel transistor in order to regulate an output voltage of the DC-to-DC converter, while deactivating the high-side n-channel transistor.

2. The power stage of claim 1, including a charge pump circuit operable to boost the voltage of the gate driver signal that is provided to the gate of the high-side n-channel transistor.

3. The power stage of claim 1, in which if the supply voltage is above the predetermined threshold voltage, the control circuit is operable to provide a constant voltage that is substantially equal to 0 volts to the gate of the high-side n-channel transistor to deactivate the high-side n-channel transistor, and operable to regulate the duty cycle of a gate driver signal provided to the gate of the high-side p-channel transistor in order to regulate an output voltage of the DC-to-DC converter.

4. The power stage of claim 1, in which the control circuitry is operable to cause the high-side n-channel transistor to serve as the active high-side transistor of the DC-to-DC converter, while deactivating the high-side p-channel transistor, if the power supply includes a first number of batteries of a given type, and operable to cause the high-side n-channel transistor to serve as the active high-side transistor of the DC-to-DC converter, while deactivating the high-side p-channel transistor, if the power supply includes a second number of batteries of a given type.

5. The power stage of claim 4, in which the given type of battery includes a AA cell, the first number of batteries includes a single battery, and the second number of batteries includes two batteries.

6. The power stage of claim 1 in which the high-side n-channel transistor includes an NMOS transistor, and the high-side p-channel transistor includes a PMOS transistor.

7. A DC-to-DC voltage converter comprising:
   a supply voltage input;
   a high-side n-channel transistor including a source terminal, a drain terminal and a gate terminal, the drain terminal being coupled to the voltage input and the source terminal being coupled to a first node;
   a high-side p-channel transistor including a source terminal, a drain terminal and a gate terminal, the source terminal being coupled to the voltage input and the drain terminal being coupled to the first node;
   a low-side n-channel transistor including a source terminal, a drain terminal and a gate terminal, the drain terminal being coupled to the first node and the source terminal being coupled to ground;

an inductor coupled between the first node and a converter output;

a capacitor coupled between the converter output and ground; and control circuitry operable to receive information regarding a supply voltage coupled to the voltage input:

if the supply voltage is below a predetermined threshold value, the control circuitry is operable to cause the high-side n-channel transistor to serve as the active high-side transistor of the DC-to-DC converter, while deactivating the high-side p-channel transistor by providing a constant voltage that is substantially equal to the supply voltage to the gate of the high-side p-channel transistor, and if the supply voltage is above the predetermined threshold value, the control circuitry is operable to cause the high-side p-channel transistor to serve as the active high-side transistor of the DC-to-DC converter by regulating the duty cycle of a gate driver signal provided to the gate of the high-side p-channel transistor in order to regulate an output voltage of the DC-to-DC converter, while deactivating the high-side n-channel transistor.

8. The DC-to-DC voltage converter of claim 7, including a charge pump circuit operable to boost the voltage of the gate driver signal that is provided to the gate of the high-side n-channel transistor.

9. The DC-to-DC voltage converter of claim 7, in which if the supply voltage is above the predetermined threshold voltage, the control circuit is operable to provide a constant voltage that is substantially equal to 0 volts to the gate of the high-side n-channel transistor, thereby deactivating the high-side n-channel transistor, and operable to regulate the duty cycle of a gate driver signal provided to the gate of the high-side p-channel transistor in order to regulate an output voltage of the DC-to-DC converter.

10. The DC-to-DC voltage converter of claim 7, in which the control circuitry is operable to cause the high-side n-channel transistor to serve as the active high-side transistor of the DC-to-DC converter, while deactivating the high-side p-channel transistor, if the power supply includes a first number of batteries of a given type, and operable to cause the high-side n-channel transistor to serve as the active high-side transistor of the DC-to-DC converter, while deactivating the high-side p-channel transistor, if the power supply includes a second number of batteries of a given type.

11. The DC-to-DC voltage converter of claim 10, in which the given type of battery includes a AA cell, the first number of batteries includes a single battery, and the second number of batteries includes two batteries.

12. The DC-to-DC voltage converter of claim 7 in which the high-side n-channel transistor includes an NMOS transistor, and the high-side p-channel transistor includes a PMOS transistor.

13. A method of operating a power stage of a DC-to-DC converter, comprising:

providing a high-side n-channel transistor including a source terminal, a drain terminal and a gate terminal, the drain terminal being coupled to a power supply voltage input, and the source terminal being coupled to a first node that is coupled to an output of the DC-to-DC converter;

providing a high-side p-channel transistor including a source terminal, a drain terminal and a gate terminal, the source terminal being coupled to the voltage input and the drain terminal being coupled to the first node;

comparing the power supply voltage to a threshold voltage level;

if the power supply voltage is less than the threshold voltage level, causing the high-side n-channel transistor to serve as the active high-side transistor of the DC-to-DC converter, and deactivating the high-side p-channel transistor by providing a constant voltage that is substantially equal to the supply voltage to the gate of the high-side p-channel transistor; and if the power supply voltage is greater than the threshold voltage level, causing the high-side p-channel transistor to serve as the active high-side transistor of the DC-to-DC converter by regulating the duty cycle of a gate driver signal provided to the gate of the high-side p-channel transistor in order to regulate an output voltage of the DC-to-DC converter, and deactivating the high-side n-channel transistor.

14. The method of claim 13, including boosting, using a charge pump, the voltage of the gate driver signal that is provided to the gate of the high-side n-channel transistor.

15. The method of claim 14, including:

if the power supply voltage is greater than the predetermined threshold voltage, providing a constant voltage that is substantially equal to 0 volts to the gate of the high-side n-channel transistor, to deactivate the high-side n-channel transistor.

* * * * *